United States Patent [19]
Konno

[11] Patent Number: 5,787,690
[45] Date of Patent: Aug. 4, 1998

[54] RESIDUAL PRODUCT REMOVING APPARATUS

[75] Inventor: Hidetoshi Konno, Kanagawa, Japan

[73] Assignee: Tetra Laval Holdings & Finance S.A., Japan

[21] Appl. No.: 831,241

[22] Filed: Apr. 2, 1997

Related U.S. Application Data

[62] Division of Ser. No. 564,195, Dec. 7, 1995, Pat. No. 5,678,372.

[30] Foreign Application Priority Data

Jul. 9, 1993 [JP] Japan .................................... 5-169957

[51] Int. Cl.$^6$ ...................................................... B65B 9/06
[52] U.S. Cl. .............................. 53/550; 53/551; 53/373.7; 53/374.2; 53/375.9
[58] Field of Search .......................... 53/373.7, 373.8, 53/374.2, 374.3, 375.9, 376.2, 550, 551, 477, 451

[56] References Cited

U.S. PATENT DOCUMENTS

| | | | |
|---|---|---|---|
| 4,512,138 | 4/1985 | Greenawalt | 53/374.2 |
| 4,630,429 | 12/1986 | Christine | 53/551 |
| 4,757,668 | 7/1988 | Klirkel et al. | 53/375.9 |
| 5,207,049 | 5/1993 | Baruffato et al. | 53/374.2 |
| 5,403,427 | 4/1995 | Wilcox | 53/323.7 |

FOREIGN PATENT DOCUMENTS

| | | | |
|---|---|---|---|
| 0148426 | 6/1991 | Japan | 53/374.2 |
| 4142231 | 5/1992 | Japan | 53/374.2 |

Primary Examiner—James F. Coan
Assistant Examiner—Gene L. Kim
Attorney, Agent, or Firm—Lorusso & Loud

[57] ABSTRACT

A residual product removing apparatus which can prevent a liquid food (12) from flowing out even when a seal portion (S) is cut at its center. A pair of cutting rails (31, 32) are disposed in a cutting jaw (15a), and a cutter (21) is disposed in a clearance (33) formed between the cutting rails (31, 32) to be movable in advancing and retracting directions. A packaging material is cut at opposing portions (11a, 11b) when the cutter (21) is advanced. Dollies (31a, 32a) are disposed along the cutting rails (31, 32). A pair of heating bodies are disposed in a heat sealing jaw (15b) so as to squeeze and seal the opposing portions (11a, 11b) of the packaging material in cooperation with the dollies (31a, 32a). A groove (38) is formed between the heating bodies. The tip of the cutter (21) enters the groove (38) when the cutter (21) is advanced, and the tip of the cutter (21) presses the packaging material when the cutter (21) is located at its retracted position. Accordingly, no product remaining portion is produced between the opposing portions (11a, 11b) of the packaging material.

2 Claims, 7 Drawing Sheets

5,787,690

RESIDUAL PRODUCT REMOVING APPARATUS

This application is a division of application Ser. No. 08/564,195, filed Dec. 7, 1995, allowed Mar. 20, 1997, as U.S. Pat. No. 5,678,372.

TECHNICAL FIELD

The present invention relates to a residual product removing apparatus.

BACKGROUND ART

Conventionally, in a process for manufacturing a container for liquid foods such as milk and soft drinks, a web-like packaging material made of a flexible laminated material is supplied to a filling apparatus. In the filling apparatus, the packaging material is formed into a tube, which is filled with a liquid food, and then cut into a brick-shaped container.

In detail, the filling apparatus seals the web-like packaging material in the longitudinal direction to form a tube, and continuously feeds the tube downward. While the tube is fed downward, liquid food is supplied to the tube from its top. Then, the tube is pressed from the both sides thereof by sealing/cutting units so that sealing in the lateral direction is carried out at predetermined intervals.

Subsequently, a laterally sealed portion is cut to form a plurality of rectangular containers each holding a predetermined amount of the liquid food therein, thereby completing the manufacture of containers.

FIG. 1 is a schematic illustration showing a main portion of a conventional filling apparatus. In FIG. 1, section (a) is a schematic illustration showing a forming unit, section (b) is an illustration showing an engaged state of engaging members, and section (c) is an illustration showing a disengaged state of the engaging members.

In this drawing, reference numeral 11 is a tube made of a flexible laminated material and formed by sealing a web-like packaging material in the longitudinal direction. The packaging material is laminated, for example, such that lamination layers thereof will be in the order of a polyethylene layer, an aluminum foil layer, an adhesive layer, a paper material and a polyethylene layer, from inside to outside of a container which will be formed from the packaging material.

The tube 11 is continuously transferred downward, and squeezed and sealed in the lateral direction at predetermined intervals by two sealing/cutting units 14 and 15, thereby forming a strip-shaped seal portion S. While the tube is fed downward, a liquid food 12 is supplied to the tube 11 from its top.

Then, the seal portion S is cut to form a rectangular container 23 filled with a predetermined amount of the liquid food 12. For these operations, both of the sealing/cutting units 14 and 15 have cutting jaws 14a and 15a and heat sealing jaws 14b and 15b.

Moreover, a cutting bar 18 is attached to the forward end of each cutting jaw 14a, 15a while an inductor 19 is attached to the forward end of each heat sealing jaw 14b, 15b. The cutting jaws 14a and 15a and the heat sealing jaws 14b and 15b are advanced to squeeze the tube 11 from both sides thereof for bringing opposing inner faces of the tube 11 in contact with each other and sealing in the lateral direction.

Also, at the center of the cutting jaws 14a and 15a, a flat cutter 21 extending in the lateral direction is disposed to be movable in advancing and retracting directions. The seal portion S is cut at its center when the cutter is advanced. For moving the cutter 21 forward and backward, a cylinder 22 is attached to the backward end of the cutter 21, and an operating fluid is fed to and drained from the cylinder 22 for moving the cutter 21 forward and backward.

Reference numerals 21a and 21b are a pair of forming flaps which are pivotably attached to the cutting jaws 14a and 15a and the heat sealing jaws 14b and 15b for enclosing and guiding the tube 11 and form the tube 11 into a rectangle.

In the drawing, the sealing/cutting unit 14 is in the position of starting the sealing/cutting operation, where the cutting jaw 14a and the heat sealing jaw 14b are advanced to squeeze the tube 11 from both sides thereof for bringing opposing inner faces of the tube 11 in contact with each other.

Then, the sealing/cutting unit 14 moves downward while holding the tube 11 squeezed. While the sealing/cutting unit 14 is moving downward, the inductor 19 disposed at the forward end of the heat sealing jaw 14b and the cutting bar 18 disposed at the forward end of the cutting jaw 14a strongly press the seal portion S, and the inductor 19 causes the aluminum foil layer of the packaging material to generate heat by induction heating to laterally seal the tube 11 for forming the seal portion S. In this case, the inductor 19 is used to seal the tube 11 by induction heating. However, a resistance element may be used to seal the tube 11 by generating Joule heat.

Meanwhile, in the figure, the sealing/cutting unit 15 is in the position where the sealing/cutting operation is completed. Immediately before the sealing/cutting unit 15 reaches this position, the cutter 21 of the sealing/cutting unit 15 is advanced so that the seal portion S is cut at its center for separating the rectangular container 23 from the tube 11.

When the seal portion S has been cut at its center, the cutting jaw 15a and heat sealing jaw 15b of the sealing/cutting unit 15 is retracted and then moved upward to the position of starting the sealing/cutting operation. When the sealing/cutting unit 15 reaches the position of starting the sealing/cutting operation and begins to move the cutting jaw 15a and the heat sealing jaw 15b, the cutter 21 of the sealing/cutting unit 14 is advanced to cut the seal portion S at its center for separating the rectangular container 23 from the tube 11.

Reference numerals 25 and 26 are a pair of engaging hooks which form engaging members. An engaging hook 25 is attached to each cutting jaw 14a, 15a, while another engaging hook 26 is attached to each heat sealing jaws 14b, 15b. A cylinder 27 is connected to each engaging hook 26.

Then, after the engaging hooks 25 and 26 are engaged with each other, by supplying an operating medium to the cylinders 27, the cutting jaws 14a and 15a and the heat sealing jaws 14b and 15b are drawn toward each other, thereby increasing the pressing force in sealing. In the position of starting the sealing/cutting operation, the engaging hooks 25 and 26 are engaged with each other as shown in section (b) of FIG. 1 while in the position of finishing the sealing/cutting operation, the hooks are disengaged from each other as shown in section (c) of FIG. 1.

Next, the sealing/cutting unit 15 will be described in detail.

FIG. 2 is a sectional view of a main portion of a sealing/cutting unit of a conventional filling apparatus.

In this drawing, reference numeral 11 is a tube, and reference numerals 11a and 11b are opposing portions of the packaging material constituting the tube 11. Reference numeral 15 is a sealing/cutting unit, reference numeral 15a is a cutting jaw, reference numeral 15b is a heat sealing jaw, reference numeral 19 is an inductor, and reference 21 is a cutter.

The cutting jaw 15a has a pair of cutting rails 31 and 32. The cutter 21 is disposed in a clearance 33 formed between the cutting rails 31 and 32, and is advanced and retracted in the direction of arrow A by a cylinder 22 (FIG. 1).

The cutting rails 31 and 32 have dollies 31a and 32a, respectively, extending along the cutting rails 31 and 32. The seal portion S of the tube 11 is strongly pressed by the dollies 31a and 32a. Hence, the dollies 31a and 32a are made flat at their surfaces opposed to the heat sealing jaw 15b. The seal portion S comprises first and second seal portions $S_1$ and $S_2$ corresponding to the dollies 31a and 32a, respectively.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36. Incidentally, reference numeral 40 is a product remaining portion, and reference numeral 41 is a clearance.

However, in the conventional filling apparatus, when the cutting jaws 15a and the heat sealing jaw 15b are advanced to squeeze the tube 11 from both sides thereof for bringing opposing portions 11a and 11b of the tube 11 in contact with each other and sealing in the lateral direction, the product remaining portion 40 in which the product, i.e., a liquid food 12, remains is formed along the seal portion S.

In detail, when the cutting jaw 15a and the heat sealing jaw 15b are advanced to squeeze the tube 11 from both sides thereof, the opposing portions 11a and 11b of the tube 11 are brought into contact with each other at the first and second seal portions $S_1$ and $S_2$. At this time, since the clearance 41 is formed between the dollies 31a and 32a, the opposing portion 11a warps toward the cutting jaw 15a across the width of the clearance 41. Also, since the groove 38 is formed in the heat sealing jaw 15b, the opposing portion 11b warps toward the heat sealing jaw 15b across the width of the groove 38.

Accordingly, the product remaining portion 40 is formed, and the liquid food 12 remains in the product remaining portion 40.

Then, when the cutter 21 is advanced to cut the seal portion S at the center thereof, i.e. between the first and second seal portions $S_1$ and $S_2$, the liquid food 12 remaining in the product remaining portion 40 flows out. Moreover, if the liquid food 12 remains adhering to a cut end surface of the opposing portions 11a and 11b, mold, yeast, bacteria and the like proliferate, causing insanitation.

An object of the present invention is to solve the problem involved in the conventional filling apparatus, and to provide a residual product removing apparatus which can prevent or suppress the forming of a product remaining portion at the center of a sealed portion.

DISCLOSURE OF THE INVENTION

To achieve the above object, the present invention provides a residual product removing apparatus in a sealing/cutting unit which comprises a cutting jaw and a heat sealing jaw which are disposed to face each other and movable in advancing and retracting directions for sealing and cutting opposing portions of a packaging material. The residual product removing apparatus includes a pair of cutting rails disposed in the cutting jaw, a cutter which is disposed in a clearance formed between the cutting rails to be movable in advancing and retracting directions and which cuts the packaging material at the opposing portions when advanced, dollies disposed along respective cutting rails, and a pair of heating bodies which are disposed in the heat sealing jaw for squeezing and sealing the opposing portions of the packaging material in cooperation with the dollies, and which form a groove therebetween to accommodate the tip of the cutter when the cutter is advanced.

When the cutting jaw and the heat sealing jaw are mutually advanced to squeeze the opposing portions of the packaging material from both sides thereof, the opposing portions of the packaging material are brought into contact with each other at a seal portion thereof. In this state, when the heating bodies are activated to generate heat, portions of the sealant layer of the packaging material which face each other are fused for sealing.

Then, when the cutter is advanced to let the tip thereof enter the groove, the opposing portions of the packaging material are cut.

In the advanced position of the cutter, the tip of the cutter enters the groove, and in the retracted position, the tip presses the packaging material. Hence, a product remaining portion is not formed between the opposing portions of the packaging material. As a result, even when the cutter is advanced to cut the sealed portion at its center, no liquid food flows out, thereby establishing sanitation.

In another residual product removing apparatus according to the present invention, the heat sealing jaw has a protuberance projecting toward the cutting jaw and formed along the peripheral edge of the groove formed between the heating bodies.

In this case, when the cutting jaw and the heat sealing jaw are mutually advanced to squeeze the packaging material from both sides thereof, the tip of the cutter and the protuberance press the opposing portions of the packaging material. Accordingly, the product remaining portion formed between the opposing portions of the packaging material can be made quite small.

In still another residual product removing apparatus according to the present invention, there are provided a pair of cutting rails disposed in the cutting jaw, a cutter which is disposed in a clearance formed between the cutting rails to be movable into advancing and retracting directions and to cut the packaging material at the opposing portions when advanced, dollies disposed along respective cutting rails, and a pair of heating bodies which are disposed in the heat sealing jaw for squeezing and sealing the opposing portions of the packaging material in cooperation with the dollies, and which form a groove therebetween to accommodate the tip of the cutter when the cutter is advanced.

Also, the cutting jaw has pressing portions projecting toward the heat sealing jaw and formed along peripheral edges of the clearance formed between the cutting rails.

In this case, when the cutting jaw and the heat sealing jaw are mutually advanced to squeeze the opposing portions of the packaging material from both sides thereof, the pressing portions press the packaging material. Accordingly, the product remaining portion formed between the opposing portions of the packaging material can be made quite small.

In yet another residual product removing apparatus according to the present invention, the pressing portions are integrally formed with the cutting rails, respectively.

In this case, when the cutting jaw and the heat sealing jaw are mutually advanced to squeeze the opposing portions of the packaging material from both sides thereof, the cutting rails press the packaging material. Accordingly, the product remaining portion formed between the opposing portions of the packaging material can be made quite small.

In a still further residual product removing apparatus according to the present invention, the pressing portions are integrally formed with the dollies, respectively.

In this case, when the cutting jaw and the heat sealing jaw are mutually advanced to squeeze the opposing portions of the packaging material from both sides thereof, the dollies press the packaging material. Accordingly, the product remaining portion formed between the opposing portions of the packaging material can be made quite small.

BEST MODE FOR CARRYING OUT THE INVENTION

The embodiments of the present invention will next be described in detail with reference to the drawings.

Figure 1A:
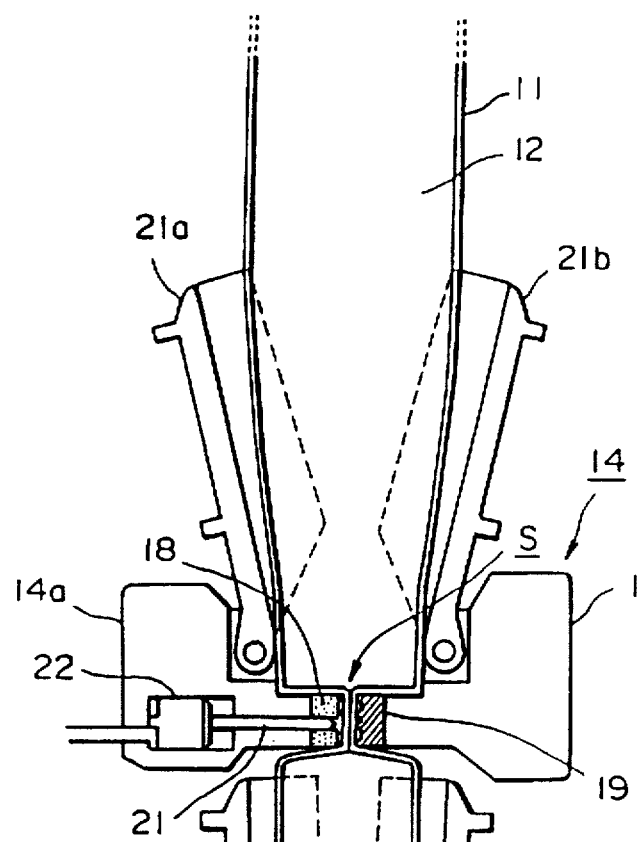
FIG. 1(a) to 1(c) are schematic illustrations showing a main portion of a conventional filling apparatus.
Figure 1B:
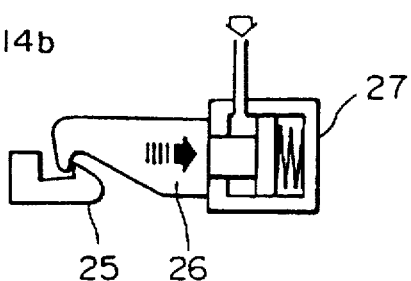
Figure 1C:
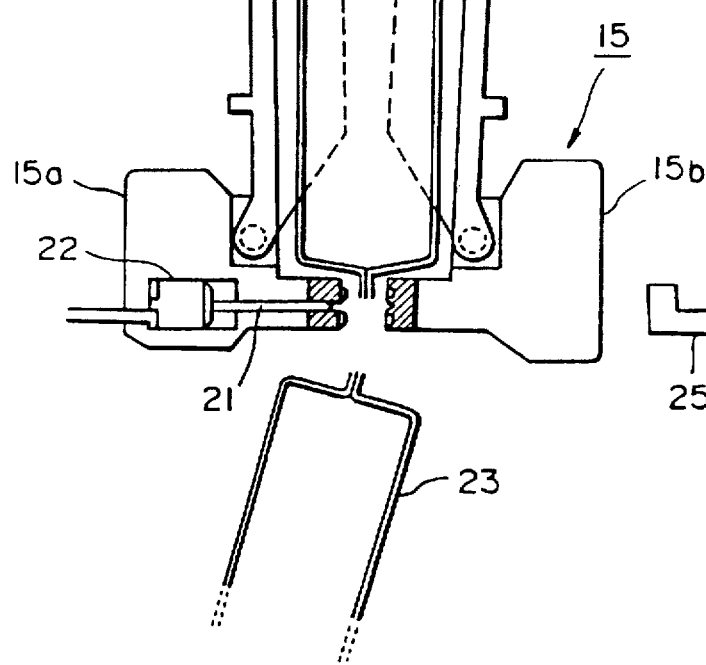
Figure 1C:
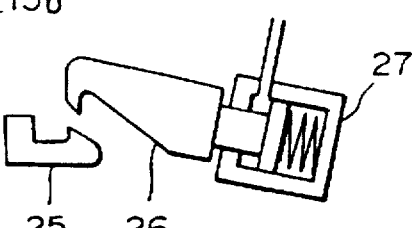
Figure 2:
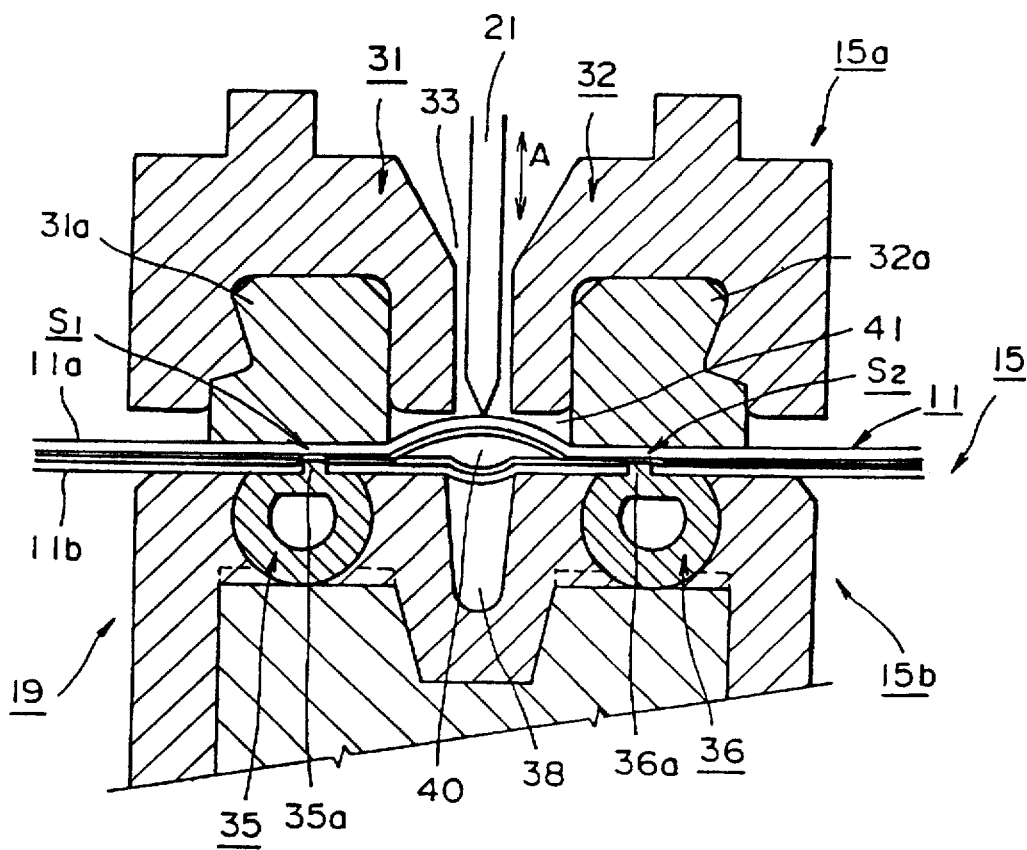
FIG. 2 is a sectional view of a main portion of a sealing/cutting unit of the conventional filling apparatus.
Figure 3:
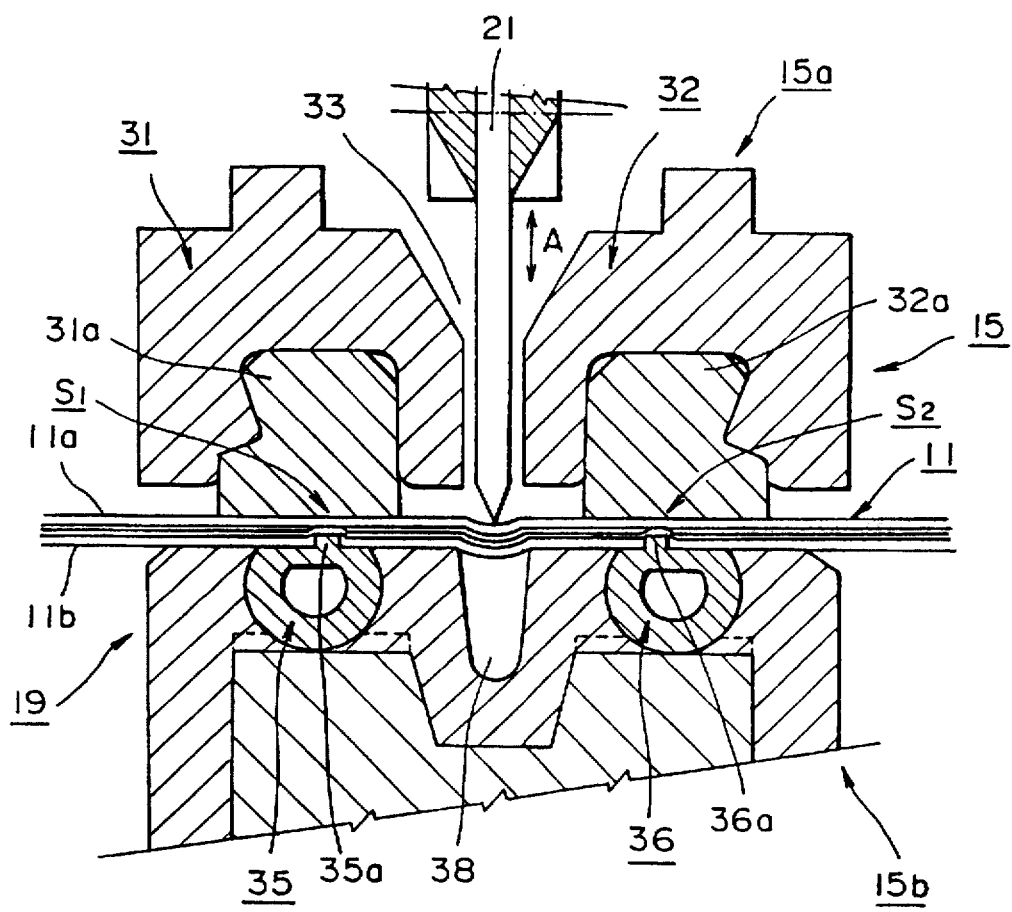
FIG. 3 is a sectional view of a residual product removing apparatus showing a first embodiment of the present invention.

FIG. 3 is a sectional view of a residual product removing apparatus showing a first embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference 21 is a cutter.

The cutting jaw 15a has a pair of cutting rails 31 and 32. The cutter 21 is disposed in a clearance 33 formed between the cutting rails 31 and 32, and is advanced and retracted in the direction of arrow A by a cylinder 22 (see FIG. 1).

The cutting rails 31 and 32 have dollies 31a and 32a, respectively, extending along the cutting rails 31 and 32. The seal portion S of the tube 11 is strongly pressed by the dollies 31a and 32a. Hence, the dollies 31a and 32a are made flat at their surfaces opposed to the heat sealing jaw 15b. The seal portion S comprises first and second seal portions $S_1$ and $S_2$ corresponding to the dollies 31a and 32a, respectively.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 35a and 36a projecting toward the cutting jaw 15a. When a high-frequency current is supplied to the first and second induction heating bodies 35 and 36, an eddy current flows in the aluminum foil layer of the packaging material to generate heat in the aluminum foil layer by an eddy-current loss. Due to this heat, mutually contacting portions of the polyethylene layer of the packaging material, which serves as a sealant layer, is molten for sealing.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter 21 enters the groove 38 to cut the opposing portions 11a and 11b. In the retracted position, the tip presses the opposing portion 11a and also slightly warps the opposing portion 11a toward the heat sealing jaw 15b.

When the cutting jaw 15a and the heat sealing jaw 15b are advanced to squeeze the tube 11 from both sides thereof, the opposing portions 11a and 11b are brought into contact with each other at the first and second seal portions $S_1$ and $S_2$. At this time, since the groove 38 is formed in the heat sealing jaw 15b, the opposing portion 11b warps toward the heat sealing jaw 15b across the width of the groove 38. Also, the tip of the cutter 21 presses the opposing portion 11a and also slightly warps the opposing portion 11a toward the heat sealing jaw 15b.

Accordingly, no product remaining portion is formed between the opposing portions 11a and 11b. As a result, even when the cutter 21 is advanced to cut the seal portion S at its center, i.e. between the first and second seal portions $S_1$ and $S_2$, no liquid food 12 flows out, thereby establishing sanitation.

If there is a possibility that the tip of the cutter 21 contacts the aluminum foil layer of the packaging material at the opposing portion 11a when the cutter 21 is located at the retracted position, it is preferred that the cutter 21 be made of ceramic so that an eddy current in the aluminum foil layer will not flow into the cutter 21 when the seal portion S is sealed.

Next, the second embodiment of the present invention will be described.

Figure 4:
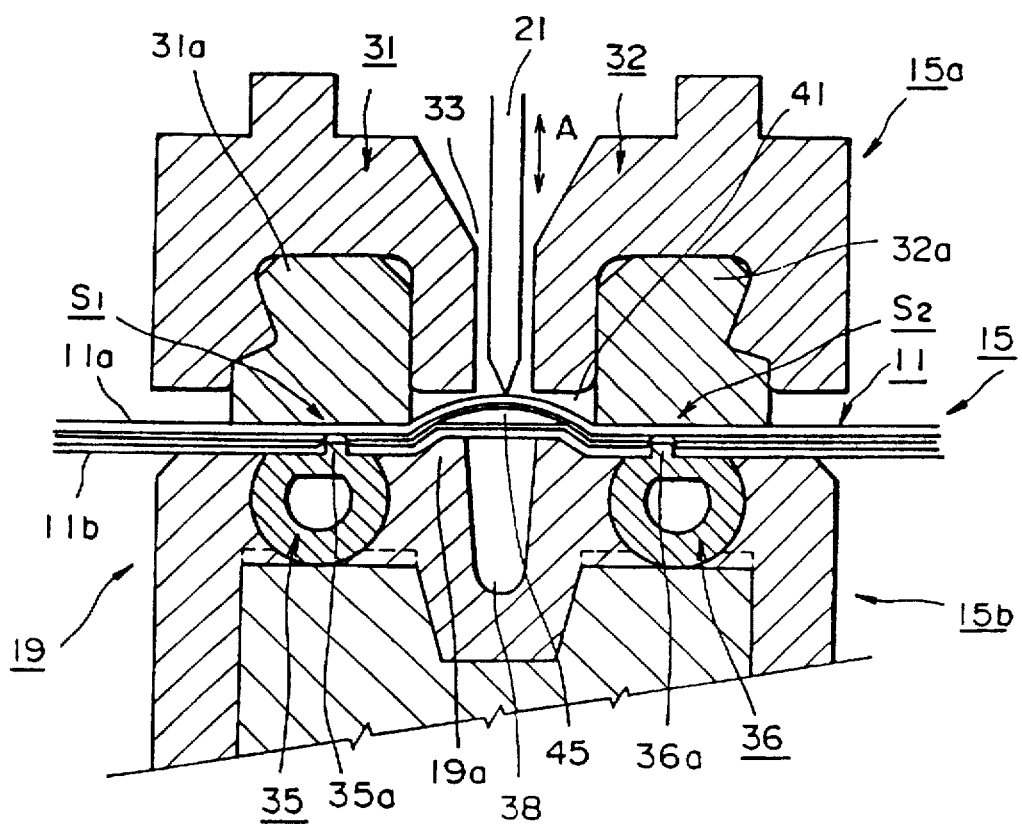
FIG. 4 is a sectional view of a residual product removing apparatus showing a second embodiment of the present invention.

FIG. 4 is a sectional view of a residual product removing apparatus showing the second embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference 21 is a cutter.

The cutting jaw 15a has a pair of cutting rails 31 and 32. The cutter 21 is disposed in a clearance 33 formed between the cutting rails 31 and 32, and is advanced and retracted in the direction of arrow A by a cylinder 22 (see FIG. 1).

The cutting rails 31 and 32 have dollies 31a and 32a, respectively, extending along the cutting rails 31 and 32. The seal portion S of the tube 11 is strongly pressed by the dollies 31a and 32a. Hence, the dollies 31a and 32a are made flat at their surfaces opposed to the heat sealing jaw 15b. The seal portion S comprises first and second seal portions $S_1$ and $S_2$ corresponding to the dollies 31a and 32a, respectively.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 35a and 36a projecting toward the cutting jaw 15a.

Also, a protuberance 19a which slightly projects toward the cutting jaw 15a, is formed between the first and second induction heating bodies 35 and 36. A groove 38 is formed in the protuberance 19a to accommodate the tip of the cutter 21 when the cutter 21 is advanced. The protuberance 19a and the groove 38 extend along the first and second induction heating bodies 35 and 36.

Meanwhile, the cutter 21 is advanced and retracted in the direction of arrow A by the cylinder 22. In the advanced position of the cutter 21, the tip of the cutter 21 enters the groove 38 to cut the opposing portions 11a and 11b. In the retracted position, the tip presses the opposing portion 11a.

In this case, the retracted position of the cutter 21 is set at a position closer to the cutting jaw 15a compared to the retracted position in the first embodiment. Since a clearance 41 is formed between the dollies 31a and 32a, the opposing portion 11a warps toward the cutting jaw 15a across the width of the clearance 41. However, since the opposing portion 11b is deflected toward the cutting jaw 15a by the protuberance 19a, a portion of the packaging material corresponding to the groove 38 does not warp toward the heat sealing jaw 15b side. Accordingly, a production remaining portion 45 formed between the opposing portions 11a and 11b can be made quite small.

If there is a possibility that the tip of the cutter 21 contacts the aluminum foil layer of the packaging material at the opposing portion 11a when the cutter 21 is located at the retracted position, it is preferred that the cutter 21 be made of ceramic so that an eddy current in the aluminum foil layer will not flow into the cutter 21 when the seal portion S is sealed.

Next, the third embodiment of the present invention will be described.

Figure 5:
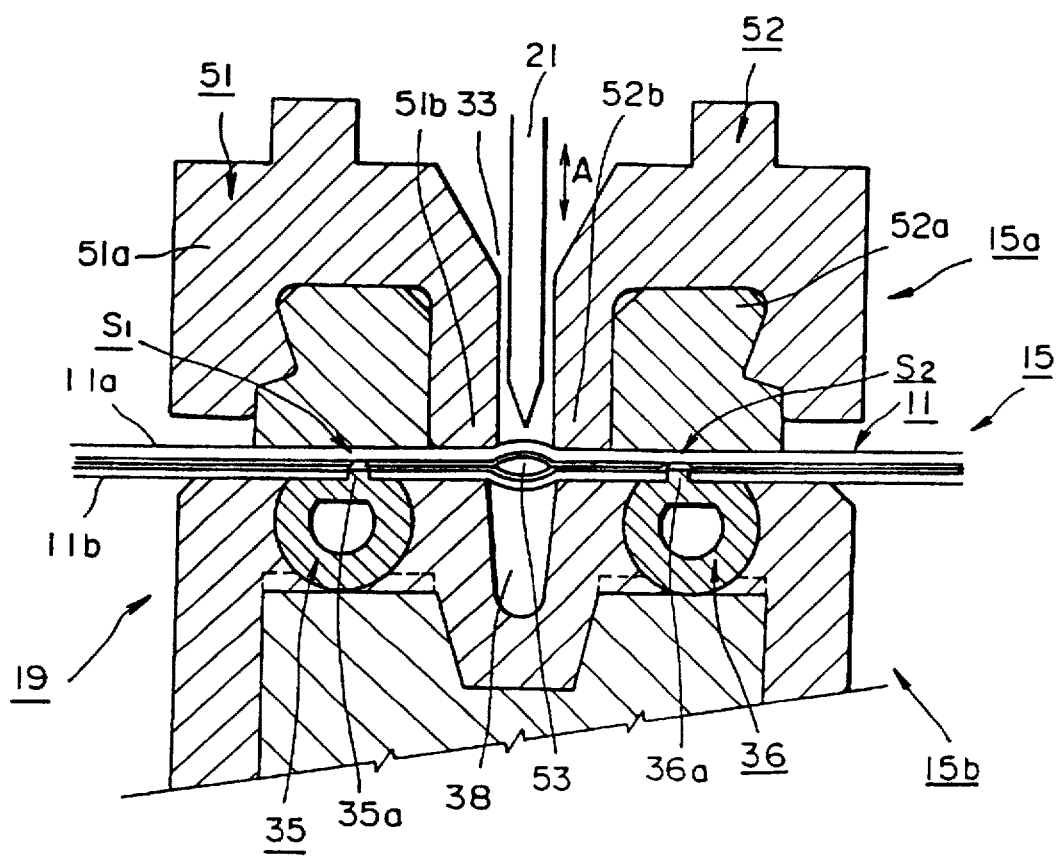
FIG. 5 is a sectional view of a residual product removing apparatus showing a third embodiment of the present invention.

FIG. 5 is a sectional view of a residual product removing apparatus showing the third embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference numeral 21 is a cutter.

The cutting jaw 15a has a pair of cutting rails 51 and 52. The cutter 21 is disposed in a clearance 33 formed between the cutting rails 51 and 52, and is advanced and retracted in the direction of arrow A by a cylinder 22 (see FIG. 1).

The cutting rails 51 and 52 have dollies 51a and 52a, respectively, extending along the cutting rails 51 and 52. The seal portion S of the tube 11 is strongly pressed by the dollies 51a and 52a. Hence, the dollies 51a and 52a are made flat at their surfaces opposed to the heat sealing jaw 15b. The seal portion S comprises first and second seal portions $S_1$ and $S_2$ corresponding to the dollies 51a and 52a, respectively.

Also, the cutting rails 51 and 52 have pressing portions 51b and 52b extending toward the heat sealing jaw 15b between the dollies 51a and 52a. Surfaces of the pressing portions 51b and 52b opposed to the heat sealing jaw 15b are placed substantially on the same plane as the surfaces of the dollies 51a and 52a opposed to the heat sealing jaw 15b.

Meanwhile, the inductor 19 has the first and second induction heating bodies 35 and 36 disposed opposite the dollies 51a and 52a. The first and second induction heating bodies 35 and 36 extend along the dollies 51aand 52a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter 21 enters the groove 38 to cut the opposing portions 11a and 11b. In the retracted position, the tip is off the opposing portion 11a.

In this case, in the retracted position of the cutter 21, the tip of the cutter 21 is off the opposing portion 11a, but the surfaces of the pressing portions 51b and 52b opposed to the heat sealing jaw 15b press the seal portion S of the tube 11 together with the dollies 51a and 52a.

Accordingly, since the warping of the opposing portion 11a toward the cutting jaw 15a can be suppressed, a product remaining portion 53 formed between the opposing portions 11a and 11b can be made quite small.

Next, the fourth embodiment of the present invention will be described.

Figure 6:
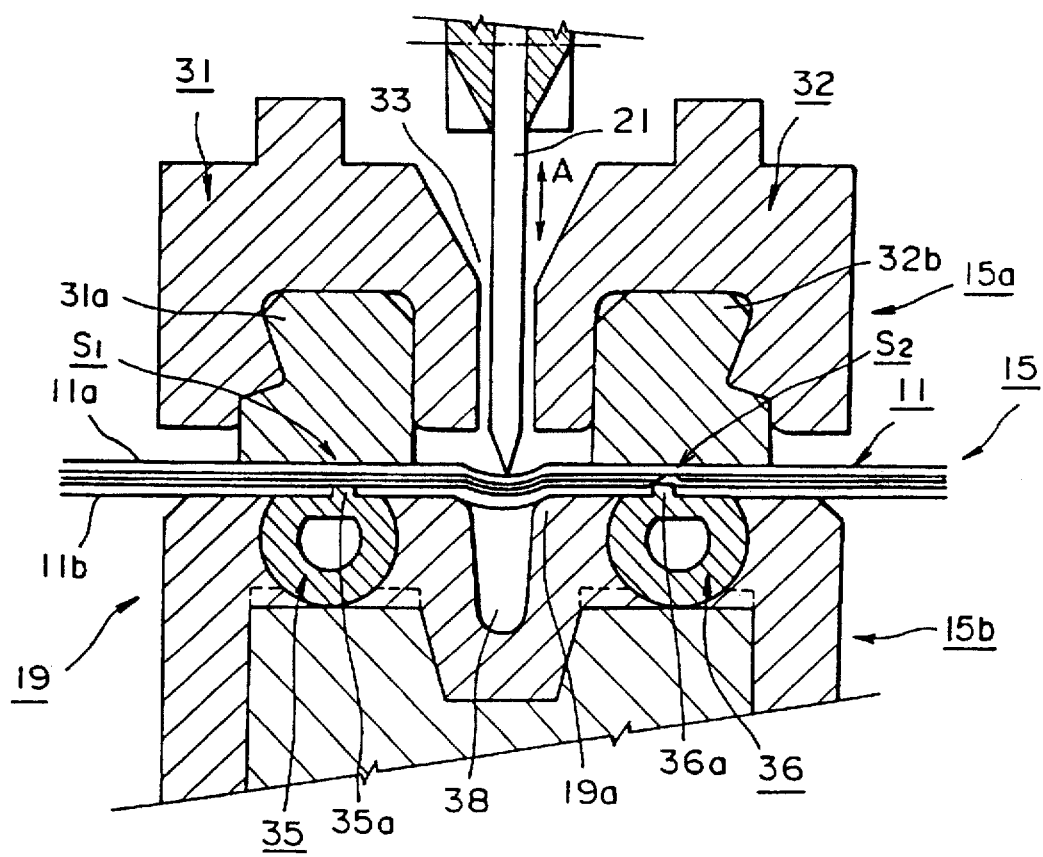
FIG. 6 is a sectional view of a residual product removing apparatus showing a fourth embodiment of the present invention.

FIG. 6 is a sectional view of a residual product removing apparatus showing the fourth embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference numeral 21 is a cutter.

The cutting jaw 15a has a pair of cutting rails 31 and 32. The cutter 21 is disposed in a clearance 33 formed between the cutting rails 31 and 32.

The cutting rails 31 and 32 have dollies 31a and 32a, respectively, extending along the cutting rails 31 and 32. The seal portion S of the tube 11 is strongly pressed by the dollies 31a and 32a.

Meanwhile, the inductor 19 has the first and second induction heating bodies 35 and 36 disposed opposite the dollies 31a and 32a. The first and second induction heating bodies 35 and 36 extend along the dollies 31a and 32a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter enters the groove 38 to cut the opposing portions 11a and 11b. In the retracted position, the tip presses the opposing portion 11a and slightly warps the opposing portion 11a toward the heat sealing jaw 15b side.

Accordingly, when the cutting jaw 15a and the heat sealing jaw 15b are advanced to squeeze the tube 11 from both sides thereof, the opposing portions 11a and 11b are brought into contact with each other at the first and second seal portions $S_1$ and $S_2$. At this time, since the groove 38 is formed in the heat sealing jaw 15b, the opposing portion 11b warps toward the heat sealing jaw 15b side across the width of the groove 38. Hence, the tip of the cutter 21 presses the opposing portion 11a and slightly warps the opposing portion 11a toward the heat sealing jaw 15b.

As a result, no product remaining portion is formed between the opposing portions 11a and 11b. As a result, even when the cutter 21 is advanced to cut the seal portion S at its center, i.e. between the first and second seal portions $S_1$ and $S_2$, no liquid food 12 flows out, thereby establishing sanitation.

In this case, since an edge portion 19a is rounded, a radius of curvature of the warping of the opposing portions 11a and 11b toward the heat sealing jaw 15b becomes large. Hence, when the tip of the cutter 21 presses the opposing portion 11a in the retracted position of the cutter 21, the opposing portion 11a can easily be warped toward the heat sealing jaw 15b.

If there is a possibility that the tip of the cutter 21 contacts the aluminum foil layer of the packaging material at the opposing portion 11a when the cutter 21 is located at the retracted position, it is preferred that the cutter 21 be made of ceramic so that an eddy current in the aluminum foil layer will not flow into the cutter 21 while the seal portion S is sealed.

Next, the fifth embodiment of the present invention will be described.

Figure 7:
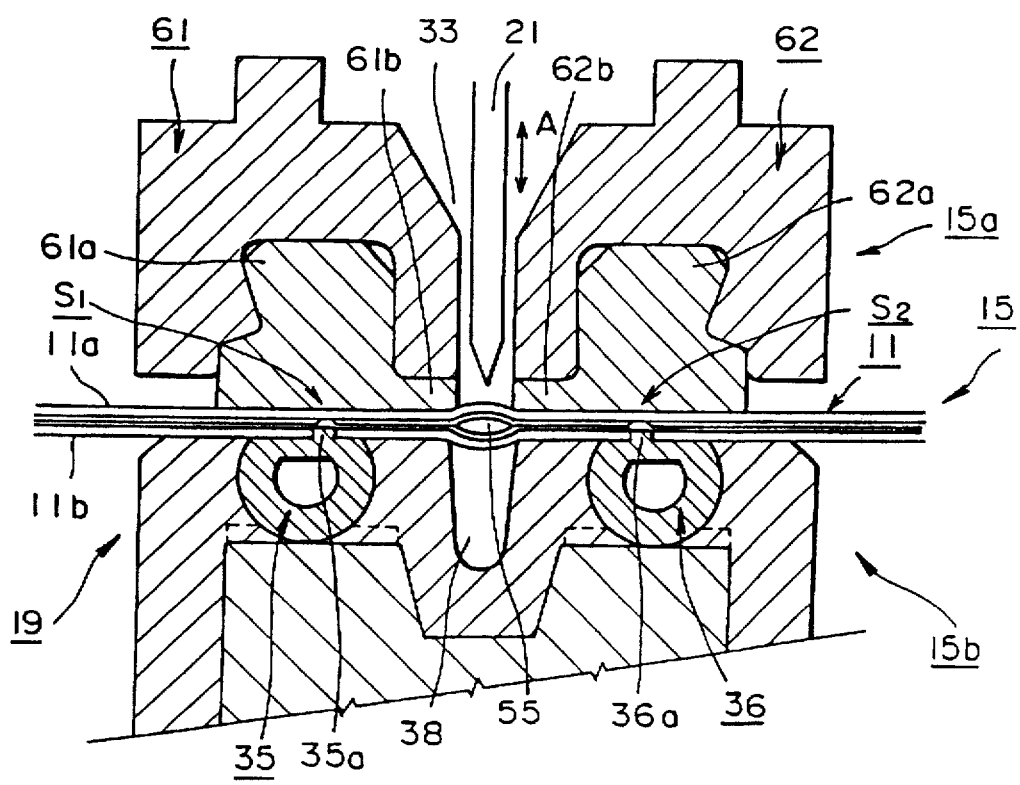
FIG. 7 is a sectional view of a residual product removing apparatus showing a fifth embodiment of the present invention.

FIG. 7 is a sectional view of a residual product removing apparatus showing the fifth embodiment of the present invention.

In this drawing, reference numeral 11 is a tube, and reference numerals 11a and 11b are opposing portions of a packaging material constituting the tube 11. Reference numeral 15 is a sealing/cutting unit, reference numeral 15a is a cutting jaw, reference numeral 15b is a heat sealing jaw, reference numeral 19 is an inductor, and reference numeral 21 is a cutter.

The cutting jaw 15a has a pair of cutting rails 61 and 62. The cutter 21 is disposed in a clearance 33 formed between the cutting rails 61 and 62.

The cutting rails 61 and 62 have dollies 61a and 62a, respectively, extending along the cutting rails 61 and 62. The seal portion S of the tube 11 is strongly pressed by the dollies 61a and 62a.

Also, the dollies 61a and 62a have pressing portions 61b and 62b, respectively, extending toward each other. Surfaces of the pressing portions 61b and 62b opposed to the heat sealing jaw 15b are placed on the same plane as the surfaces of the dollies 61a and 62a opposed to the heat sealing jaw 15b.

Meanwhile, the inductor 19 has the first and second induction heating bodies 35 and 36 disposed opposite the dollies 61a and 62a. The first and second induction heating bodies 35 and 36 extend along the dollies 61a and 62a and have projections 35a and 36a projecting toward the cutting jaw 15a.

Also, a groove 38 is formed between the first and second induction heating bodies 35 and 36 to accommodate the tip of the cutter 21 when the cutter 21 is advanced. The groove 38 extends along the first and second induction heating bodies 35 and 36.

Meanwhile, the cutter 21 is advanced and retracted in the direction of arrow A by the cylinder 22. In the advanced position of the cutter 21, the tip of the cutter enters the groove 38 to cut the opposing portions 11a and 11b. In the retracted position, the tip is off the opposing portion 11a.

In this case, in the retracted position of the cutter 21, the tip of the cutter 21 is off the opposing portion 11a, but the pressing portions 61b and 62b press the seal portion S of the tube 11.

Accordingly, since the warping of the opposing portion 11a toward the cutting jaw 15a can be suppressed, a product remaining portion 55 formed between the opposing portions 11a and 11b can be made quite small.

The present invention is not limited to the above-described embodiments. Numerous modifications and variations of the present invention are possible in light of the spirit of the present invention, and they are not excluded from the scope of the present invention.

I claim:

1. A packaging apparatus for packaging a product in a tubular segment of a flexible packaging material tube, with seals at each end of the tubular segment substantially free of residual product, said apparatus comprising:

a cutting jaw and a heat sealing jaw mounted for reciprocating linear motion relative to each other between an advanced position, for pressing the packaging material tube closed along a line transverse to the packaging material tube, and a retracted position;

a cutting blade mounted in said cutting jaw for reciprocating movement relative to said cutting jaw in said advanced position, thereby severing said packaging material tube along the transverse line;

wherein said cutting jaw comprises a pair of spaced rails extending parallel to the transverse line, each of said rails having an inboard leg and an outboard leg defining a mounting groove therebetween, said inboard legs defining therebetween a straight-walled guideway in which said cutting blade reciprocates and having distal ends with planar surfaces which mate with a planar surface of said heat sealing jaw in said advanced position to press the packaging material therebetween, one end of said guideway terminating at the planar surfaces of said distal ends;

wherein said heat-sealing jaw comprises a pair of embedded heating elements, arranged parallel to the transverse line on opposite sides of a groove formed within the planar surface of said heat-sealing jaw, for forming transverse seals in said packaging material tube in said advanced position, said groove receiving said cutting blade in a severing operation; and a pair of spaced, separate dollies mounted in respective mounting grooves on opposing sides of said guideway, each dolly presenting a planar surface coplanar with and contiguous to the planar surface of the inboard leg defining its mounting groove, said planar surface of said dolly mating with said planar surface of said heat sealing jaw in said advanced position.

2. A packaging apparatus for packaging a product in a tubular segment of a flexible packaging material tube, with seals at each end of the tubular segment substantially free of residual product, said apparatus comprising:

a cutting jaw and a heat sealing jaw mounted for reciprocating linear motion relative to each other between an advanced position for pressing the packaging material tube closed along a line transverse to the packaging material tube, and a retracted position;

a cutting blade mounted in said cutting jaw for reciprocating movement relative to said cutting jaw in said advanced position, thereby severing said packaging material tube along the transverse line;

wherein said cutting jaw comprises a pair of rails extending parallel to the transverse line, each of said rails having an inboard leg and an outboard leg defining a mounting groove therebetween, said inboard legs defining therebetween a guideway segment in which said cutting blade reciprocates;

wherein said heat sealing jaw comprises a pair of embedded heating elements, arranged parallel to the transverse line on opposite sides of a groove formed within the planar surface of said heat sealing jaw, for forming transverse seals in said packaging material tube in said advanced position, said groove receiving said cutting blade in a severing operation; and a pair of spaced, separate dollies mounted in respective mounting grooves on opposing sides of said guideway, each dolly having a projection mating with an inboard leg and extending to a distal end aligned with said guideway segment to define, in combination with its mating inboard leg, a straight-walled guideway including said guideway segment, and presenting a first planar surface which mates with a second planar surface of said heat sealing jaw in said advanced position to press the packaging material therebetween, one end of said straight-walled guideway terminating at the first planar surfaces of said dollies.

* * * * *